G. ORNSTEIN.
APPARATUS FOR TREATING WATER.
APPLICATION FILED MAY 9, 1913.
1,233,371.
Patented July 17, 1917.
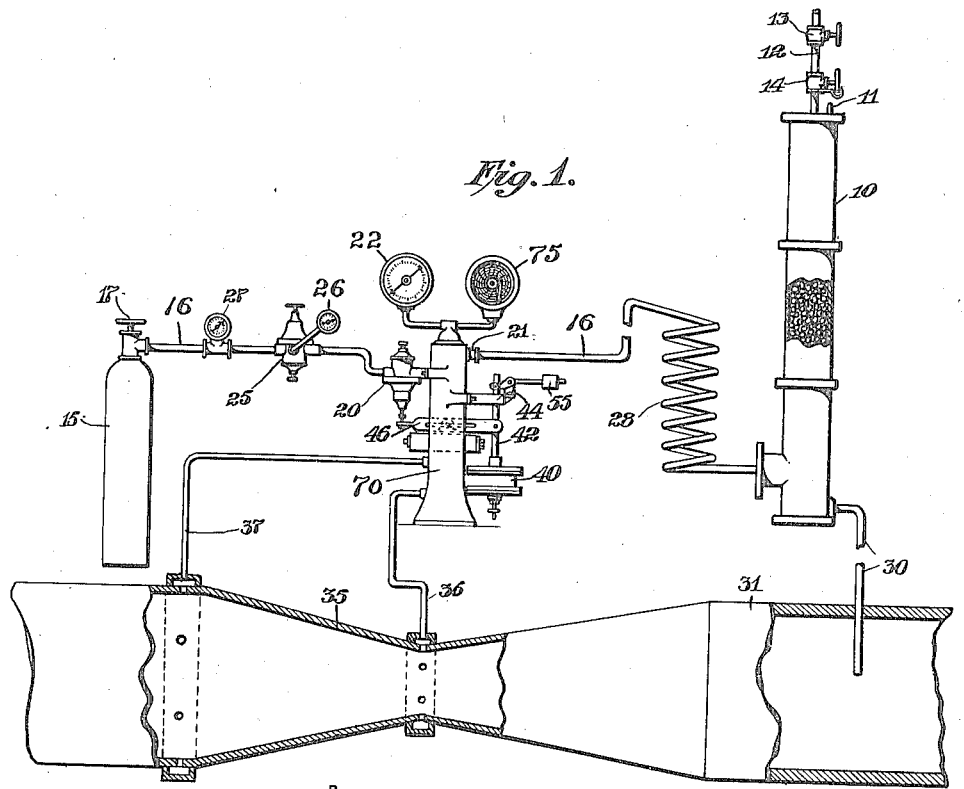
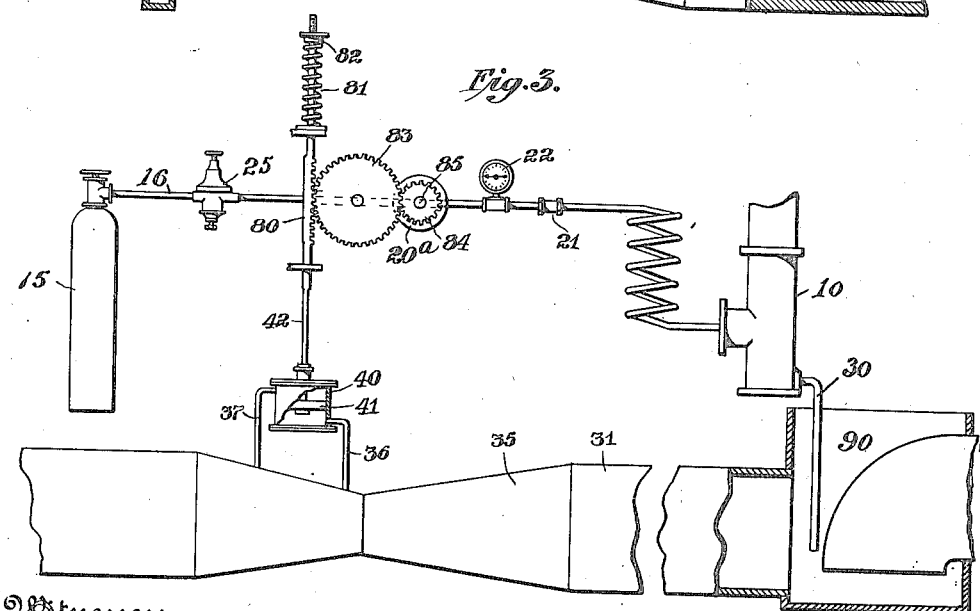

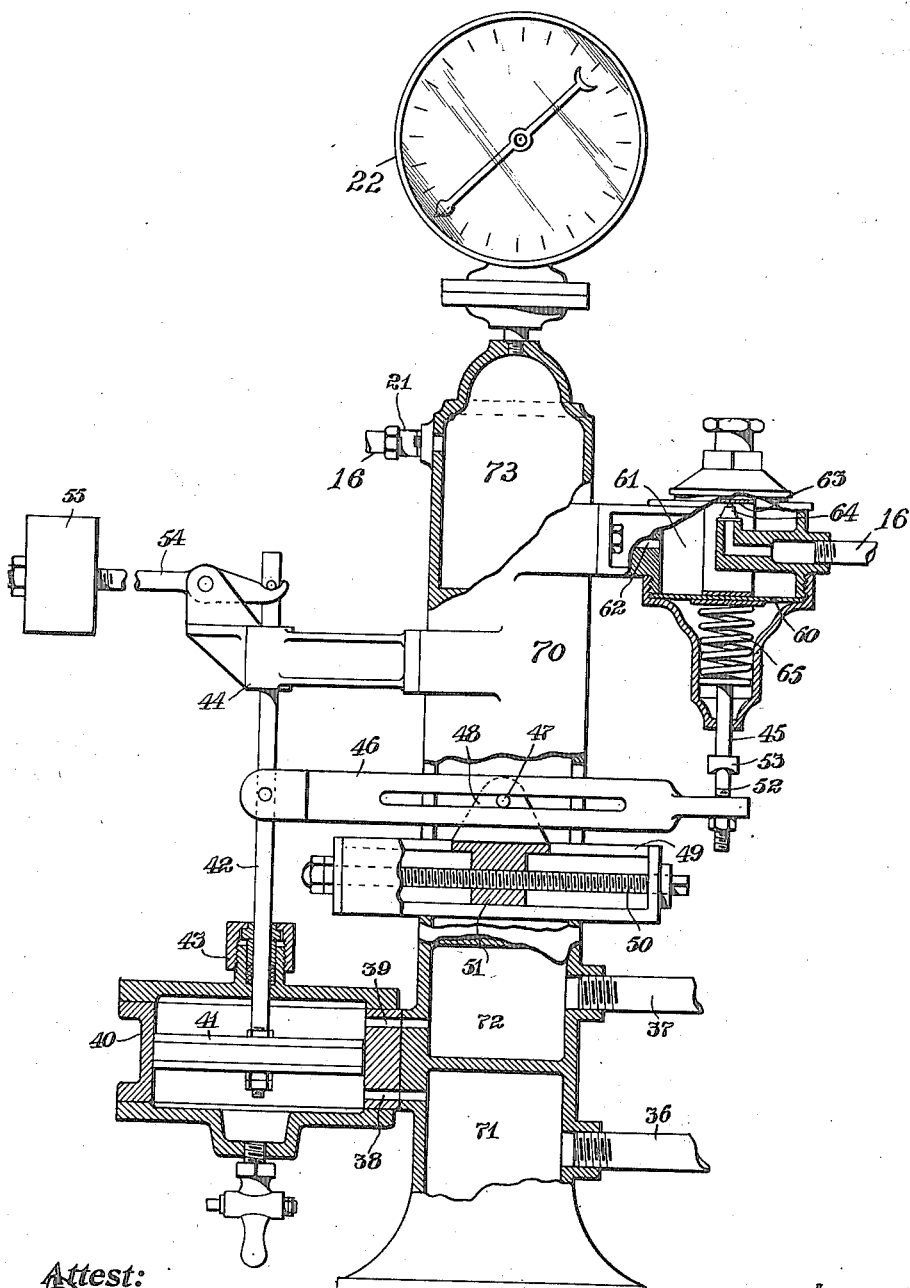

UNITED STATES PATENT OFFICE.

GEORG ORNSTEIN, OF NEW YORK, N. Y., ASSIGNOR TO ELECTRO BLEACHING GAS COMPANY, A CORPORATION OF NEW YORK.

APPARATUS FOR TREATING WATER.

1,233,371.   Specification of Letters Patent.   Patented July 17, 1917.

Application filed May 9, 1913. Serial No. 766,502.

*To all whom it may concern:*

Be it known that I, GEORG ORNSTEIN, a citizen of the German Empire, residing at New York city, in the county of New York and State of New York, have invented certain new and useful Improvements in Apparatus for Treating Water, fully described and represented in the following specification and the accompanying drawings, forming a part of the same.

This invention relates to apparatus for treating water, and more particularly to means whereby in an apparatus or system for adding a treating agent to flowing water the rate at which the treating agent is added or supplied to the flowing water will be automatically controlled according to the quantity of water flowing.

The invention has been made especially with the idea of providing a practical reliable apparatus whereby a sterilizing gas, and more particularly chlorin, may be added in suitable relatively small proportionate and automatically regulated amounts to flowing water, such as the water of city or town supplies or sewage or other watery liquids.

Chlorin in its free state is a very powerful sterilizing agent or antiseptic, as little as 0.1 to 0.4 parts of free chlorin per million parts of water being sufficient to substantially sterilize most river or lake water, provided the chlorin is uniformly distributed through the water before it has had time to disappear as free chlorin, entering into combination and losing to a large degree its sterilizing power. More contaminated water, such as sewage, requires, of course, a proportionately greater amount of chlorin for its purification. The use of an excess of chlorin in sterilizing water over the amount necessary for effecting the desired result is objectionable from the standpoint of economy and also for other reasons. It is important, therefore, that in treating flowing water the chlorin shall be supplied and added to the water at a uniform accurately controlled rate; and where the rate of flow of the water to be treated is not constant it becomes necessary that the rate of supply of chlorin thereto shall be changed or varied proportionately with variations in the rate of flow of the water. In U. S. Patent No. 1,142,361, dated June 8, 1915, granted on an application filed by me, there is described a process and apparatus whereby chlorin may be supplied in determined amounts and uniformly distributed through a flowing body of water. A principal object of the present invention is to provide means for automatically varying the rate of supply of chlorin in apparatus such as shown in said patent and in carrying out the process therein described. The invention is not, however, limited in its use to the apparatus and process of said patent, but it is adapted to be, and may be, used as applied to, and in connection with, other forms of apparatus and in carrying out other processes of treating water with chlorin, and generally in adding treating agents to flowing water.

It has been proposed heretofore to automatically control and regulate the quantity of a treating gas supplied to flowing water according to the quantity of water flowing, but the apparatus heretofore proposed for such purpose has, as far as I am aware, been unsatisfactory and unsuitable for use under conditions commonly met with, especially in treating water of town and city water supplies. In accordance with the present invention, I regulate the rate of supply of the chlorin or other purifying agent by means controlled according to the velocity of flow of the water to be treated. For this purpose, I have made use of a difference in pressure developed between separated points in the flowing water, which difference varies with variations in the rate of flow of the water, and, therefore, in the quantity of water passing. Such a difference in pressure in the water flowing in a closed conduit may be developed by various means. In most city and town water supplies and sewage systems, the water, using the term in the broad sense to include sewage and other watery liquids, is caused to flow through closed pipe lines or conduits, and it is customary to interpose in the conduit at a suitable point a Venturi tube for the purpose of measuring the flow of water by means of a Venturi meter. I find that such a Venturi tube, either one installed in the conduit for the purpose of measuring the flow or quantity of the water passing by means of a Venturi meter or one especially installed for my purpose, provides a most suitable means in connection with other parts or features of my apparatus for proportionately regulating the supply of chlorin or other treating agent. For this purpose, I make use of the difference in water pressure developed by the Venturi tube for controlling a regulating device whereby the rate of supply of the chlorin to the flowing water is regulated, and, most advantageously, I control by such difference in water pressure a pressure reducing and regulating valve or device interposed in the supply line leading from a source of supply of chlorin under pressure, and whereby the pressure under which the gas reaches and passes through a suitably provided measuring orifice is determined. By such means very accurate proportionate control of the chlorin supplied is secured for varying quantities of water flowing past the place where the chlorin is added thereto.

A full understanding of the invention can best be given by a detailed description of an approved form of apparatus embodying the same, and such a description will now be given in connection with the accompanying drawings illustrating apparatus for carrying out the process of treating or antisepticizing water set out in my said patent and embodying the features of the present invention in an approved form. In said drawings:

Figure 1 shows such apparatus more or less diagrammatically in side elevation with parts shown in section;

Fig. 2 is an enlarged view partly in section of the automatically operating pressure controlling devices and associated parts of the apparatus shown in Fig. 1;

Fig. 3 shows more or less diagrammatically an alternative form of apparatus.

Referring to the drawings, the apparatus shown in Fig. 1 is one in which the desired result of adding a definite quantity of chlorin to the water to be treated is secured by supplying the chlorin gas at a measured rate, causing it to be absorbed by a minor flow of water, and then discharging the chlorinated minor flow of water directly into the main body of water to be treated. The apparatus comprises an absorption tower 10 through which the minor flow of water passes downward to absorb an upwardly moving current of chlorin gas. The absorption tower may be formed of a vertically set shell of earthenware or other suitable material resistant to chlorin, filled, or substantially filled, with broken stone, coke, or other distributing material adapted to film out the water and cause it to present an extended area of surface for contact with the ascending current of gas. The tower should be provided with a vent as at 11 whereby the pressure within the tower is maintained at, or substantially at, atmospheric pressure. Water is supplied to the top of the tower through a supply pipe 12 provided with a shut-off valve 13 and a regulating valve 14.

The chlorin in the apparatus shown is supplied from a tank 15 of compressed and liquefied chlorin gas from which a pipe 16 leads into the lower part of the tower. Any other suitable source of supply of the gas under pressure might, of course, be used. The tank is shown as provided with the usual shut-off valve 17, and the supply pipe 16 is provided with or connects through pressure reducing and regulating means which as shown is formed by an adjustable reducing and regulating valve 20, and between such reducing valve and the tower there is a fitting 21 formed to provide a measuring or flow controlling orifice which is most advantageously a fixed orifice of known size to serve as a fixed or known measuring orifice; and between the fitting 21 and the valve 20 a suitable gage 22 is provided for indicating the pressure under which the gas reaches the measuring orifice. In order to secure practical constancy in the pressure at the measuring orifice under varying supply pressures, such as are apt to result, for example, when the gas is drawn in considerable quantity from a tank of compressed and liquefied chlorin continuously for a comparatively long time, and in order to reduce the drop in pressure past the valve 20 and thus secure more accurate regulation of the pressure on the delivery side of such valve in response to adjustment of the valve, a second reducing and regulating valve 25 may be and is best provided between the tank or source of supply and the valve 20. This valve 25 may be provided with a pressure gage 26 for showing its delivery pressure or a suitable gage for showing such pressure otherwise provided; and it is convenient, also, to have a third pressure gage 27 between the tank and the valve 25. The pipe 16 is also shown as provided, as in a form of apparatus shown in my said patent, with a protecting coil 28 which extends downwardly beyond the measuring orifice to protect the measuring and flow adjusting apparatus from moisture which might otherwise diffuse backward through the pipe from the tower. The chlorinated water from the tower is discharged through a pipe 30 to be united with the body of flowing water to be treated, and as here shown the pipe 30 leads directly into the conduit 31 through which the water to be treated flows, such an arrangement being suitable when the pressure in the conduit is not greater than would be overcome by the head of water in the pipe 30 resulting from the elevation of the tower above the conduit. The minor flow of water will thus, after being chlorinated in the tower, be discharged directly and continuously into the water from the tower.

The apparatus as so far described is substantially the same as one of the forms of apparatus shown in my said patent. In use, the shut-off valve being open and the reducing valve 25 being adjusted to supply the gas at a pressure more or less above that under which it is desired that the gas shall reach the measuring orifice, the chlorin will then flow past the measuring orifice 21 and be supplied to the absorption tower 10 at a rate depending upon the adjustment of the valve 20. Water being then supplied to the top of the tower through the pipe 12, the chlorin gas rising upward through the tower will be absorbed by the down-flowing water and continuously carried away through the pipe 30 to be supplied to the water flowing through the conduit 31 at the rate at which the chlorin gas is supplied to the tower. The rate at which the chlorin is supplied to the water to be treated will thus be that at which the chlorin gas passes the measuring orifice 21, and the rate of flow past the measuring orifice will depend upon the pressure under which it reaches the orifice and will, therefore, be controlled by the adjustable pressure reducing valve 20. The pressure at the measuring orifice, moreover, will be shown by the gage 22 and if the orifice is of known size, the quantity of chlorin being supplied, or the rate of flow, at any time may be readily determined from a reading of the gage, and conversely the rate of flow or supply of chlorin may be adjusted by adjusting the valve 20 according to the indications of the gage 22. The supply of water to the tower through the pipe 12 should be adjusted so that there will be enough water flowing through the tower to completely absorb all the entering chlorin gas, and may be in such quantity as to result in a solution of greater or less strength as desired. Obviously, the exact amount of water flowing through the tower is immaterial, since whatever the strength of the solution produced, chlorin will be supplied to the water flowing through the conduit at the rate at which it enters the tower provided the chlorinated water is allowed to flow freely from the tower into the conduit. It is advisable, however, to use a considerably greater flow of water through the tower than is required to absorb the chlorin, since by using such greater amount a better distribution of the chlorin through the water to be treated is secured.

In order to regulate the supply of chlorin proportionately to the quantity of water flowing through the conduit 31, there is provided in the apparatus shown in the drawings, means controlled by the difference in pressure developed by a Venturi tube interposed in the conduit 31 for adjusting or controlling the valve 20. The Venturi tube is indicated at 35. From two suitable points of different pressures, as from the point of narrowest cross-section, or critical point, of the Venturi tube, and from a point at or adjacent to the beginning or inlet end thereof, lead pressure pipes 36 and 37, respectively, which respectively connect with inlet passages 38 and 39 opening into opposite ends of a closed chamber which, as shown, is formed by a short cylinder 40. The differential pressure pipes might, of course, lead from other suitable separated points between which a difference in pressure is developed by the Venturi tube. Fitted within the cylindrical differential pressure chamber thus provided is a piston 41 which stands between the inlets 38 and 39. Pressure will thus be exerted on one side of the piston 41, the lower side as shown in Fig. 2, equal to the pressure in the water conduit at the point where the pipe 36 connects with the conduit, that is, at the critical point of the Venturi tube as shown in the drawings; and a pressure will be exerted on the other or upper side of the piston equal to the pressure in the conduit at the point where the pipe 37 enters the conduit; and when the water is flowing through the conduit the pressure on the upper side of the piston will thus be greater than the pressure on the lower side thereof, and the piston will tend to move downward.

A piston rod 42 extends upward from the piston 41 through a suitable stuffing box 43 and through a guide 44 and is connected to actuate and control the adjusting rod 45 of the valve 20. As shown, the connection between the piston rod and the valve rod is by means of a lever 46 pivotally connected at one end to the piston rod and mounted to rock on a fulcrum 47, the position of which in the direction of the length of the lever is adjustable for varying the power exerted on the valve rod relatively to that exerted by the piston. To provide for such adjustment of the fulcrum, it comprises a fulcrum pin extending between vertical guide plates 48 and through a longitudinal slot formed in the lever, and it is mounted to slide in a guideway 49 on which it is moved longitudinally of the lever and held in any desired position of adjustment by means of an adjusting screw 50 working through a threaded lug 51 extending downward from the fulcrum. The actuating end of the lever has operative connection with the valve rod 45 by means of a bearing pin 52, the rounded upper end of which bears against the recessed end of a head or cup 53 on the end of the valve rod. To provide for adjustment, this bearing pin is best formed by a threaded pin extending through a threaded opening in the end of the lever and locked in position by means of a nut thereon. For counterbalancing the weight of the piston 41 and other moving parts, an adjustable counterbalance is provided which as shown consists of a lever 54 pivotally mounted with its short arm engaging to bear upward on the piston rod 42 and with its long arm carrying an adjustable weight 55.

The pressure reducing and regulating valve 20 in the apparatus shown is of the spring controlled type having a valve controlling diaphragm which is subject to the pressure of the outgoing gas on one side to move the diaphragm to close the valve orifice, and which is moved in the other direction, or to open the valve orifice, by the pressure or tension of a spring which is adjustable to vary such opening force exerted on the diaphragm, thereby varying the gas pressure on the outlet side of the valve under which the diaphragm will be moved to close the valve orifice and at which pressure the gas on the outlet side of the valve will, therefore, be maintained. In the valve shown in the drawings, the diaphragm 60 forms one side of a valve chamber 61 from which the gas is discharged through an outlet opening 62, and carries a seat 63 which by movement of the diaphragm under pressure of the gas in the chamber closes against a gas inlet nozzle 64. The diaphragm is subjected to the pressure of a spring 65 which tends to move the diaphragm against the pressure of the gas in the chamber 61 to carry the seat 63 away from the gas inlet nozzle. For delicacy of operation, this spring is best arranged to act directly against the outer side of the diaphragm. For adjusting the spring to vary the pressure under which the gas is supplied from the valve, the outer end of the spring is supported by means of the adjusting rod 45, which as here shown is a sliding rod, the position of which is controlled by the pressure exerted thereon by the piston 41 acting through the lever 46. It will be observed that in the apparatus shown, the varying power exerted by the piston 41 through the lever 46 is transmitted directly to the valve spring 65 and through the spring to the diaphragm 60, the spring thus serving as means for exerting a gradually increasing opposition to the downward movement of the piston 41, and also as the direct means for exerting yielding pressure on the diaphragm 60 to open the valve.

In the form of apparatus shown in the drawings, the various parts of the automatic controlling apparatus are carried by a chambered pedestal 70. The cylinder 40 forming the differential pressure chamber is mounted on the pedestal near its base and the inlet passages 38 and 39 connect through the wall of the pedestal with separated chambers 71 and 72 with which the pressure pipes 36 and 37 are respectively connected. The valve 20 is secured to the opposite side of the pedestal from the cylinder 40 and near the top thereof, and the outlet passage 62, from the chamber 61 of the valve leads through the wall of the pedestal into a chamber 73. The chlorin supply pipe 16 is connected directly with the valve on its supply side, and the continuation of the pipe 16 leads from the chamber 73, being connected therewith through the fitting 21 which provides the measuring orifice, and which fitting may be connected directly with the wall of the pedestal as shown. The pressure gage 22 is mounted at the top of the pedestal and connects with the chamber 73. The lever 46, its fulcrum 47, and the guideway 49, are housed in a through opening formed in the pedestal between the chambers 72 and 73.

The gage 22 will usually be a sight reading gage, and in order that a record shall be made of the pressure under which the chlorin reaches the measuring orifice, and, therefore, of the rate of supply, it is desirable to provide also a recording gage. Such a recording gage for making a continuous record is shown at 75 in Fig. 1 mounted on the pedestal and connected with the chamber 73.

In the operation of the apparatus, the shut-off valve 17 being open and reducing valve 25 being set to effect a suitable reduction in the pressure of the chlorin gas, the amount of gas passing to the tower 10 will then depend upon the adjustment of the valve 20, that is, on the pressure under which the gas reaches the measuring orifice 21. The gas entering the lower part of the tower will be absorbed by the minor flow of water passing downward through the tower and the chlorinated water will be continuously supplied through the pipe 30 to the water flowing through the conduit 31. The rate at which the chlorin is supplied to the water to be treated will thus depend upon the pressure under which the gas reaches the measuring orifice 21 and will be controlled by the adjustable pressure reducing and regulating valve 20, as hereinbefore pointed out.

When water is flowing through the conduit 31, there will be a drop in pressure from the entrance end of the Venturi tube to the critical point thereof, and the difference in pressure between two longitudinally separated points, as the points at which the tubes 36 and 37 enter, will vary closely with the square of the velocity of flow of the water through the conduit. The piston will, therefore, tend to move downward under a pressure difference which will vary with the square of the velocity of the water flowing through the conduit 31. The power of the piston transmitted through the lever 46 to the valve rod 45 will compress the valve spring 65, and the valve spring will thus be caused to exert pressure on the diaphragm 60 which will be more or less according to the rate of flow of water through the conduit and will vary approximately in proportion to the square of the velocity of the water flowing through the conduit, or according to the square of the quantity of water passing through the conduit in a given time. The pressure exerted on the diaphragm 60 by the valve spring tends to open the valve orifice at the nozzle 64 and will maintain such orifice opened so long as, and whenever, the pressure in the chamber 61 acting on the diaphragm 60 is insufficient to overcome the pressure of the spring. The pressure in the chamber 61 and in the chamber 73 and, therefore, the pressure under which the gas reaches the measuring orifice 21, will thus be controlled by the piston 41, and will be varied proportionately, or approximately proportionately, to the square of variations in flow of the water through the conduit 31; and since the amount of gas passing through the orifice 21 varies proportionately to the square root of the pressure of the gas reaching the orifice, the amount of gas supplied to the tower 10 and the amount of chlorin supplied to the water in the conduit 31 will be varied approximately in direct proportion to variations in the amount of water flowing through the conduit.

By adjusting the fulcrum 47, the power transmitted to the spring 65 from the piston 41 for any given rate of flow of water through the conduit 31 may be varied and the valve thus adjusted to give the desired rate of flow of chlorin according to the proportionate amount thereof to be added to the water. In using the apparatus, therefore, the fulcrum will be adjusted until the desired proportionate supply of chlorin is secured, and thereafter under variations in flow of water through the conduit this proportionate supply of chlorin will be approximately maintained. The size of the measuring orifice 21 being known, the rate of supply of chlorin may be determined from a reading of the gage 21 and adjustment of the rate of chlorin supply may, therefore, be made according to the indications of the gage for any known rate of flow of the water in the conduit 31; and similarly the rate of chlorin supply may be determined any time in order to check up the operation of the chlorinating apparatus with the quantity of water being treated. Of course, the proportionate amount of chlorin being added to the water may be determined correctly by testing the chlorinated water, and such tests may also be made for checking up the operation of the apparatus. An adjustable measuring orifice might also be employed in place of, or in addition to, the adjustment of the fulcrum 47 for adjusting the proportionate amount of chlorin added to the water, but it is of advantage to use a fixed orifice of known size as will be readily understood. In order that the valve shall be operated to shut off the supply of chlorin when no water is flowing through the conduit, the counterweight 55 should be adjusted so as to counterbalance the weight of the piston 41 and other connecting parts, and, on the other hand the adjustment of the weight should be such that chlorin will be supplied as soon as any substantial differential pressure acting on the piston 41 is developed.

It should be noted that in the construction shown in Figs. 1 and 2 the maximum extent of movement of the piston 41 and valve rod 45 and connecting parts and of the counter balancing lever 54 is comparatively very small, so that any disturbing factors which would result from more extensive movements of such parts may be disregarded.

In Fig. 3 I have shown an alternative form of apparatus in which the differential pressure operating means, instead of having its power transmitted directly to the spring of the pressure regulating valve 20 through a sliding valve stem, is connected to turn a screw stem whereby the tension of the valve spring is adjusted. In the particular apparatus shown in Fig. 3, the differential pressure operating means is the same as shown in Figs. 1 and 2, comprising a cylinder 40 with its piston 41, the cylinder being connected by the pressure pipes 36 and 37 with the conduit at points of different pressures produced by the Venturi tube 35. The piston rod 42, however, carries a suitably guided rack 80 and works against a spring 81 which offers a gradually increasing resistance to the downward movement of the piston. The spring may be mounted on a continuation of the piston rod or rack to bear upward against a collar 82 which is adjustable for varying the tension of the spring. The rack 80 meshes with an intermediate gear 83 which engages and turns a pinion 84 on the stem 85 of the pressure reducing and regulating valve $20^a$, the valve stem being a screw stem which bears in the usual way against the valve spring so that as the stem is turned in one direction or the other the compression of the spring will be increased or decreased. The valve may be otherwise similar to the valve 20 shown in Fig. 2. With this arrangement, when the piston 41 is moved downward under an increasing differential pressure due to an increase in the rate of flow of the water through the conduit 31, the valve stem will be turned to increase the pressure on the valve spring, thereby increasing the delivery pressure of the chlorin and increasing the rate of supply of the chlorin to the absorption tower; and when the piston 41 is moved upward with a decrease in the rate of flow of water in the conduit, the valve stem will be moved in the opposite direction to adjust the valve $20^a$ to decrease the gas pressure and thereby lessen the rate of supply of the chlorin to the absorption tower. In this figure I have shown the pipe 30 as arranged to discharge the chlorinated water into a well 90 interposed in the conduit instead of into the conduit proper as in Fig. 1.

The extent of movement of the rack 80 under the power exerted by the piston 41 against the power of the spring 81 will be in direct proportion to the power exerted by the piston, that is, in proportion to the pressure difference exerted on the piston, or in proportion to the square of the velocity of the water flowing through the conduit; and since the amount of turning movement imparted to the valve stem 85 is in direct proportion to the movement of the rack 80, the extent of longitudinal movement of the valve rod and the compression of the valve spring, and therefore, the pressure under which gas is supplied by the valve 20$^a$, will vary directly in proportion to variations in the pressure difference acting on the piston 41; and since the amount of gas passing through the orifice 21 varies proportionately to the square root of the pressure under which the gas reaches the orifice, the amount of gas supplied to the tower 10 and the amount of chlorin supplied to the flowing water, will be varied, as before, approximately in direct proportion to variations in the amount of water flowing through the conduit. In using the apparatus, the pressure of the spring 81 will be adjusted to give the desired rate of supply of chlorin for any given rate of flow of water through the conduit, such adjustment being made according to the indications of the gage 22 as before described in connection with Figs. 1 and 2.

It will be understood that the invention is not to be limited to the exact construction and arrangement of parts as shown in the drawings and to which the foregoing description has been largely confined, but that it includes changes and modifications within the claims. By the expressions "pressure regulating means" and "pressure regulating valve" as used in the claims is meant such a regulating means as operates automatically to maintain for any adjustment thereof a constant supply pressure of the treating gas, such for example, as the pressure reducing and regulating valve shown and described herein.

What is claimed is:

1. Apparatus for treating flowing water, comprising means for supplying a treating gas to the water, an adjustable automatically operating pressure regulating valve for controlling the rate of supply of the treating gas, means whereby a pressure difference is developed by the flowing water varying with variations in rate of flow of the water, and means responsive to variations in such pressure difference and operating to adjust said valve to maintain for varying rates of flow of water a fixed ratio between the rate of supply of the treating gas and the rate of flow of the water.

2. Apparatus for treating flowing water comprising means for supplying a treating gas to the water, adjustable automatically operating pressure regulating means for controlling the rate of supply of the treating gas, means for producing a difference in pressure between separated points in the flowing water, and differential pressure actuating means controlled by such difference in pressure and operating to adjust said pressure regulating means to maintain for varying rates of flow of the water a fixed ratio between the rate of supply of the treating gas and the rate of flow of the water.

3. Apparatus for treating water flowing through a conduit comprising means for supplying a treating gas to the water, pressure regulating means for controlling the rate of supply of the treating gas, means for producing a difference in pressure between separated points in the water flowing through the conduit, differential pressure actuating means connected with the conduit at points of different pressures and controlling said pressure regulating means to maintain for varying rates of flow of the water a fixed ratio between the rate of supply of the treating gas and the rate of flow of the water, and adjusting means intermediate said pressure regulating means and said differential pressure actuating means for varying the ratio between the rate of supply of the treating gas and the rate of flow of the water.

4. Apparatus for treating water flowing through a conduit comprising means for supplying a treating gas under pressure, means including an adjustable automatically operating pressure reducing and regulating device for controlling the rate of supply of the treating gas, means for producing a difference in pressure between separated points in the water flowing through the conduit varying approximately with the square of variations in the rate of flow of the water, and differential pressure actuating means connected with the conduit at points of different pressures and controlling said pressure reducing and regulating device to vary the rate of supply of the treating gas approximately in direct proportion to variations in the rate of flow of water through the conduit.

5. Apparatus for treating water comprising a closed conduit for the water to be treated, a source of supply of gaseous chlorin under pressure, means for supplying said chlorin to the water to be treated, means for controlling the rate of supply of the chlorin including a measuring orifice and a pressure reducing and regulating valve which determines the pressure under which the gaseous chlorin reaches the measuring orifice, means for producing a difference in pressure between separated points in the water flowing through the conduit, means controlled by such difference in pressure for controlling said pressure reducing and regulating valve to vary the rate of supply of the chlorin with variations in the rate of flow of the water in the conduit, and adjusting means for varying the rate of supply of the chlorin for any given rate of flow of the water.

6. Apparatus for treating water comprising a conduit for the water to be treated, a Venturi tube interposed in said conduit, a source of supply of a treating agent under pressure, means for supplying the treating agent to the water, means including a spring actuated pressure reducing and regulating valve for controlling the rate of supply of the treating agent, differential pressure chambers connected with the interior of the conduit at longitudinally separated points, the connection of one of said chambers with the conduit being at a point of relatively low pressure in the Venturi tube, and means controlled by the difference between the pressures in said chambers and connected to control said reducing valve to vary the supply of the treating agent with variations in the rate of flow of water through the conduit.

7. Apparatus for treating flowing water comprising a source of gaseous chlorin, means for producing a separate minor flow of water, means for supplying a controlled amount of such chlorin to said minor flow of water to be absorbed thereby, means for supplying the minor flow of water so treated to the main flow of water to be treated, and automatically acting means for controlling the rate of supply of such chlorin to the minor flow of water to maintain for varying rates of flow of the water to be treated, a fixed ratio between the rate of supply of chlorin and the rate of flow of the water to be treated.

8. Apparatus for treating flowing water comprising a source of gaseous chlorin, means for producing a separate minor flow of water, means for supplying a controlled amount of such chlorin to said minor flow of water to be absorbed thereby, means for supplying the minor flow of water so treated to the main flow of water to be treated, means controlled by the difference between the pressures at two points in the flowing water for controlling the rate of supply of such chlorin to the minor flow of water to maintain for varying rates of flow of the water to be treated a fixed ratio between the rate of supply of chlorin and the rate of flow of the water to be treated.

9. Apparatus for treating flowing water comprising means for producing a separate minor flow of water, a source of supply of gaseous chlorin under pressure, means for supplying said chlorin to said minor flow of water to be absorbed thereby, a pressure reducing and regulating valve for controlling the rate of supply of the chlorin, means for supplying the minor flow of water so treated to the main flow of water to be treated, and means controlled by the main flow of water for controlling said pressure reducing and regulating valve to maintain for varying rates of flow of the water to be treated a fixed ratio between the rate of supply of chlorin and the rate of flow of the water to be treated.

10. Apparatus for treating water comprising a conduit for the water to be treated, a Venturi tube interposed in said conduit, a source of supply of gaseous chlorin, means for producing a separate minor flow of water, means for supplying a controlled amount of such chlorin to such minor flow of water to be absorbed thereby, means for supplying the minor flow of water so treated to the water flowing through said conduit, and means controlled by a pressure difference developed by the Venturi tube between separated points in the water flowing through the conduit for controlling the rate of supply of chlorin to the minor flow of water, whereby under varying rates of flow of water through the conduit the rate of supply of chlorin will be maintained approximately at a fixed ratio to the rate of flow of water through the conduit.

11. Apparatus for treating water comprising a conduit for the water to be treated, a Venturi tube interposed in said conduit, a source of gaseous chlorin, means for supplying such chlorin to the water flowing through said conduit, regulating means for controlling the rate of supply of the chlorin, a controlling member, means for subjecting said member to a moving force which varies proportionately with variations in the pressure difference developed by the Venturi tube between separated points in the flowing water, and connections between said member and said regulating means, whereby the supply of chlorin will be varied approximately in direct proportion to variations in the rate of flow of water through the conduit.

12. Apparatus for treating flowing water, comprising means for supplying a treating gas under pressure, means providing a controlling orifice through which the treating gas passes, adjustable automatically operating pressure reducing and regulating means for controlling the pressure under which the treating gas reaches the controlling orifice, and means controlled by a pressure difference developed by the flowing water and operating to adjust said pressure reducing and regulating means to maintain for varying rates of flow of water a fixed ratio between the rate of supply of the treating gas and the rate of flow of the water.

13. Apparatus for treating flowing water comprising means for supplying a treating gas under pressure, pressure reducing and regulating means for controlling the rate of supply of the treating gas, means for supplying said gas to the water to be treated, and differential pressure actuating means controlled by a pressure difference developed by the flowing water and operating to adjust said pressure reducing and regulating means to maintain for varying rates of flow of the water a fixed ratio between the rate of supply of the treating gas and the rate of flow of the water.

14. Apparatus for treating flowing water, comprising means for supplying a treating gas to the water, an adjustable automatically operating pressure reducing and regulating valve for controlling the rate of supply of the treating gas, and differential pressure actuating means controlled by a pressure difference developed by the flowing water and operating to adjust said valve to maintain for varying rates of flow of water a fixed ratio between the rate of supply of the treating gas and the rate of flow of the water.

15. Apparatus for treating flowing water, comprising means for supplying a treating gas to the water, adjustable automatically operating pressure regulating means for controlling the rate of supply of the treating gas, a member controlled according to a pressure difference developed by the flowing water, a connection between said member and said regulating means for adjusting said regulating means to maintain for varying rates of flow of water a fixed ratio between the rate of supply of the treating gas and the rate of flow of the water, and adjusting means for varying the ratio between the rate of supply of the treating gas and the rate of flow of the water.

16. Apparatus for treating flowing water, comprising means for supplying a treating gas to the water, adjustable automatically operating pressure regulating means for controlling the rate of supply of the treating gas, a controlling member for adjusting said pressure regulating means to vary the rate of supply, and means for subjecting said controlling member to a moving force which varies proportionately with variations in the quantity of the water to be treated flowing, whereby the supply of the treating agent will be varied approximately in direct proportion to variations in the rate of flow of the water to be treated.

17. Apparatus for treating flowing water comprising means for supplying a treating agent to the flowing water, means for regulating the rate of supply of the treating agent including a spring-controlled member, and means independent of said spring-controlled member controlled by the flowing water for adjusting the spring of said spring controlled member to vary the power exerted by said spring and thereby vary the supply of the treating agent proportionately to the rate of flow of the water.

18. Apparatus for treating flowing water comprising a source of supply of a treating gas under pressure, means for supplying said gas to the water to be treated, means for determining the rate of supply of said gas including a spring controlled pressure reducing and regulating valve, and means controlled by the flowing water for adjusting said valve to maintain under variations in the rate of flow of the water a fixed ratio between the rate of supply of the gas and the rate of flow of the water.

19. Apparatus for treating flowing water comprising a source of supply of a treating gas under pressure, means for supplying said gas to the water to be treated, means for determining the rate of supply of said gas including a spring controlled pressure reducing and regulating valve, and automatic adjusting means for adjusting said valve to maintain under variations in the rate of flow of the water a fixed ratio between the rate of supply of the gas and the rate of flow of the water.

20. Apparatus for treating flowing water, comprising means for supplying a treating agent to the flowing water, means for controlling the rate of the supply of the treating agent including a spring-controlled pressure reducing and regulating valve, a member controlled by a pressure difference developed by the flowing water, and means for transmitting power exerted by said member to the spring of said spring controlled valve to vary the power exerted by said spring and thereby vary the supply of the treating agent proportionately to variations in the rate of flow of the water to be treated.

In testimony whereof I have hereunto set my hand in the presence of two subscribing witnesses.

GEORG ORNSTEIN.

Witnesses:
A. L. KENT,
PAUL H. FRANKE.